(12) United States Patent
Kim

(10) Patent No.: US 10,949,079 B2
(45) Date of Patent: *Mar. 16, 2021

(54) ELECTRONIC DEVICE COMBINING FUNCTIONS OF TOUCH SCREEN AND REMOTE CONTROL AND OPERATION CONTROL METHOD THEREOF

(71) Applicant: SAMSUNG ELECTRONICS CO., LTD., Suwon-si (KR)

(72) Inventor: Jae-kwon Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/680,847

(22) Filed: Nov. 12, 2019

(65) Prior Publication Data

US 2020/0081599 A1   Mar. 12, 2020

Related U.S. Application Data

(63) Continuation of application No. 15/426,517, filed on Feb. 7, 2017, now Pat. No. 10,503,389, which is a (Continued)

(30) Foreign Application Priority Data

Mar. 16, 2010   (KR) ........................ 10-2010-0023428

(51) Int. Cl.
*H04N 5/44*   (2011.01)
*G06F 3/0488*   (2013.01)
(Continued)

(52) U.S. Cl.
CPC .......... *G06F 3/0488* (2013.01); *G06F 3/0482* (2013.01); *G06F 3/0483* (2013.01);
(Continued)

(58) Field of Classification Search
CPC combination set(s) only.
See application file for complete search history.

(56) References Cited

U.S. PATENT DOCUMENTS

2003/0103088 A1   6/2003   Dresti et al.
2006/0007182 A1   1/2006   Sato et al.
(Continued)

FOREIGN PATENT DOCUMENTS

KR   10-2009-0077480 A   7/2009

OTHER PUBLICATIONS

Communication dated Nov. 10, 2016, issued by the Korean Intellectual Property Office in counterpart Korean Patent Application No. 10-2010-0023428.
(Continued)

*Primary Examiner* — Hien L Duong
(74) *Attorney, Agent, or Firm* — Sughrue Mion, PLLC

(57) ABSTRACT

An electronic device having a touch screen and an operation control method thereof are provided. The electronic includes a touch screen which receives a plurality of manipulations; and a controller which determines whether a second manipulation is made on a screen displayed on the touch screen during a predetermined time period after a first manipulation is made on the screen, and controls to perform an operation corresponding to the second manipulation instead of an operation corresponding to the first manipulation to be performed, if the second manipulation is made during the predetermined time after the first manipulation is made.

18 Claims, 14 Drawing Sheets

Related U.S. Application Data continuation of application No. 12/981,604, filed on Dec. 30, 2010, now Pat. No. 9,595,186.

(60) Provisional application No. 61/291,980, filed on Jan. 4, 2010.

(51) Int. Cl.
  *H04N 21/422* (2011.01)
  *G08C 17/00* (2006.01)
  *G06F 3/0481* (2013.01)
  *G06F 3/0482* (2013.01)
  *G06F 3/0483* (2013.01)
  *G06F 3/0486* (2013.01)
  *G08C 17/02* (2006.01)
  *G08C 23/04* (2006.01)
  *H04W 84/12* (2009.01)

(52) U.S. Cl.
  CPC ........ *G06F 3/0486* (2013.01); *G06F 3/04817* (2013.01); *G06F 3/04883* (2013.01); *G06F 3/04886* (2013.01); *G08C 17/00* (2013.01); *G08C 17/02* (2013.01); *G08C 23/04* (2013.01); *H04N 21/42204* (2013.01); *H04N 21/42209* (2013.01); *H04N 21/42224* (2013.01); *G08C 2201/30* (2013.01); *H04W 84/12* (2013.01)

(56) References Cited

U.S. PATENT DOCUMENTS

| | | |
|---|---|---|
| 2006/0119585 A1 | 6/2006 | Skinner |
| 2007/0277123 A1 | 11/2007 | Shin et al. |
| 2007/0291009 A1 | 12/2007 | Wright et al. |
| 2009/0058828 A1 | 3/2009 | Jiang et al. |
| 2009/0153288 A1 | 6/2009 | Hope et al. |
| 2009/0153289 A1* | 6/2009 | Hope .................. G06F 3/04883 340/5.1 |
| 2009/0179867 A1 | 7/2009 | Shim et al. |
| 2009/0184926 A1 | 7/2009 | Kates |
| 2009/0239587 A1 | 9/2009 | Negron et al. |
| 2009/0307631 A1 | 12/2009 | Kim et al. |
| 2010/0277337 A1* | 11/2010 | Brodersen ........ H04N 21/42224 340/12.54 |
| 2010/0306650 A1 | 12/2010 | Oh et al. |

OTHER PUBLICATIONS

Communication dated Dec. 18, 2015, issued by the Korean Intellectual Property Office in counterpart Korean Patent Application No. 10-2010-0023428.

Communication, dated Nov. 27, 2013, issued by the European Patent Office, in counterpart Application No. 10197411.1.

Communication dated Feb. 6, 2017, issued by the European Patent Office, in counterpart Application No. 16200098.8.

\* cited by examiner

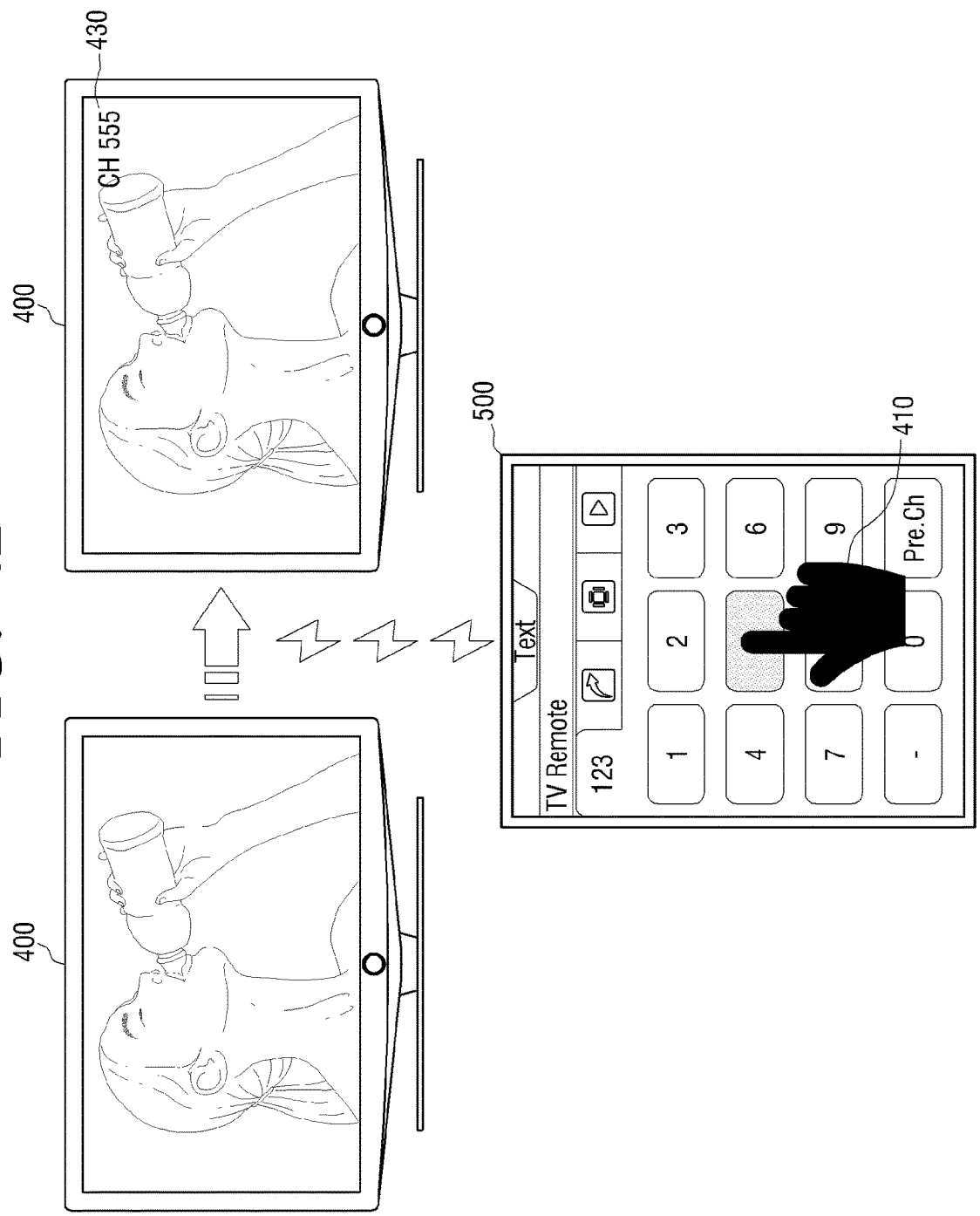

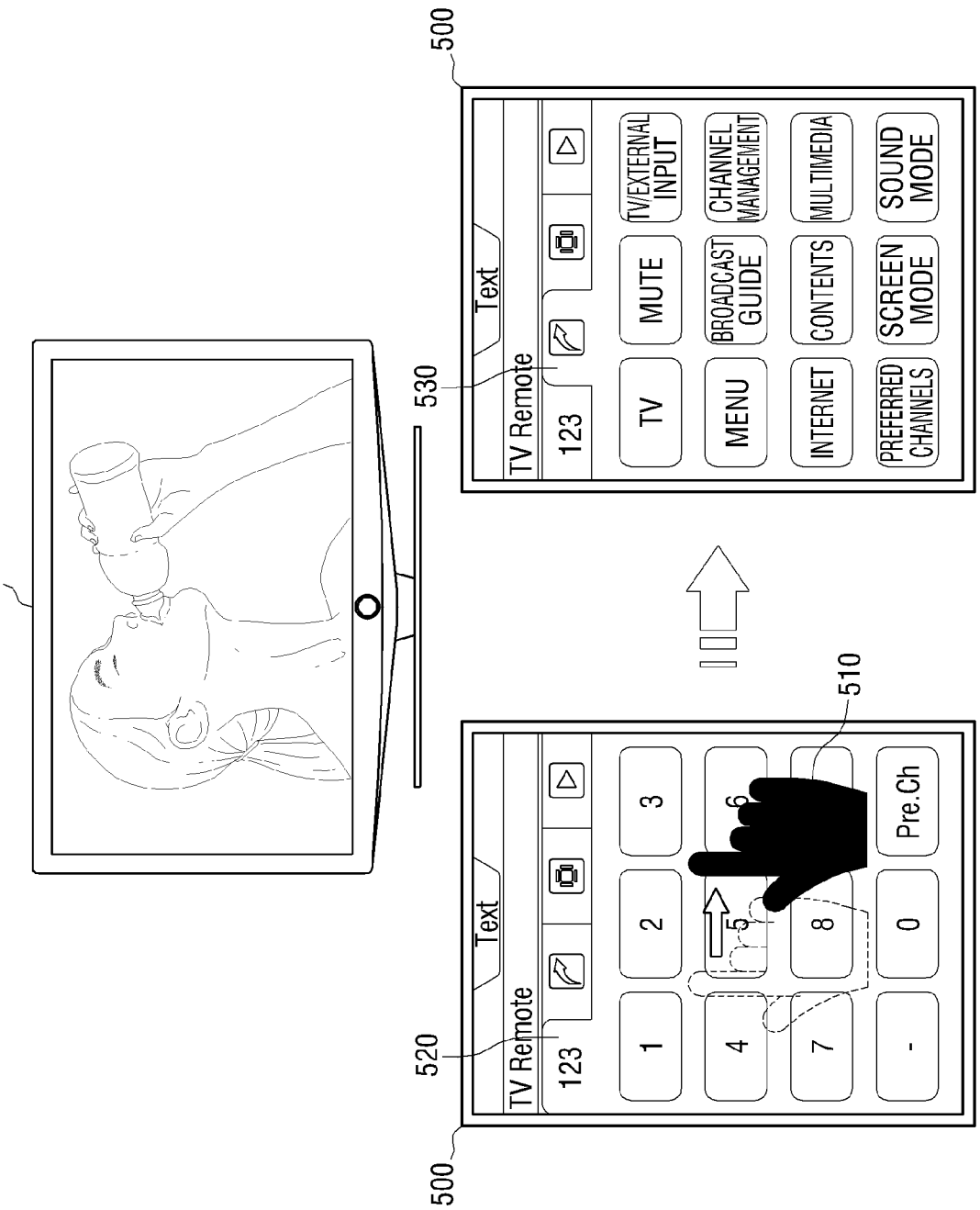

ELECTRONIC DEVICE COMBINING FUNCTIONS OF TOUCH SCREEN AND REMOTE CONTROL AND OPERATION CONTROL METHOD THEREOF

CROSS-REFERENCE TO RELATED APPLICATION

This application is a Continuation Application of U.S. application Ser. No. 15/426,517 filed Feb. 7, 2017, which is a Continuation Application of U.S. application Ser. No. 12/981,604 filed Dec. 30, 2010, issued as U.S. Pat. No. 9,595,186 on Mar. 14, 2017, which claims priority from U.S. Provisional Application No. 61/291,980 filed Jan. 4, 2010 and Korean Patent Application No. 10-2010-0023428, filed Mar. 16, 2010, the disclosures of which are incorporated herein by reference in their entireties.

BACKGROUND

1. Field

Apparatuses and methods consistent with exemplary embodiments relate to an electronic device including a touch screen and an operation control method thereof, and more particularly, to an electronic device which is capable of realizing functions of a touch screen and functions of a remote control at the same time, and an operation control method thereof.

2. Description of the Related Art

A basic operation of a remote control is to generate an infrared (IR) signal when a button is pressed, thereby controlling an external device. In addition, when the button is pressed for a long time, the remote control generates an IR signal repeatedly in order to change a channel or volume continuously. FIGS. 1A and 1B illustrate such basic operations of a remote control. That is, as illustrated in FIG. 1A, when the button is pressed (10), the remote control generates (15) an IR signal to transmit a command to an external device, thereby controlling the external device. When the button is released (30), no action is made. However, in the case when the button is released (30) after relatively quite a long time as illustrated in FIG. 1B, the remote control generates (15) an IR signal when the button is pressed (10), and then generates IR signals 25 repeatedly until the button is released (30).

Many devices adopt touch screens which enhance user convenience. For example, various devices such as mobile devices, computers, display devices having touch screens are being produced. In those devices adopting a touch screen, due to the nature of the touch screen, an action is made when an operation area of the touch screen is released. Thus, in the case of a remote control adopting a touch screen, there is a problem of not being able to realize both the functions of the remote control and the functions of the touch screen, since in the remote control, an action is made when an operation area is pressed, whereas in the touch screen, an action is made when an operation region is released.

FIGS. 1C and 1D illustrate such a problem which occurs when an action is made as a button is released in a remote control adopting a touch screen. In FIG. 1C, an action is made when the touch screen is released (60) not when the touch screen is pressed (40) according to the basic operation method of a touch screen. Here, the device is also a remote control adopting a touch screen, and thus, the action would generate (45) an IR signal to control an external device.

According to the above, even when the touch screen is pressed (40) for a long time in order to change a channel or volume continuously, only one IR signal would be generated (45) when the button is released (60), making it impossible to realize a continuous button inputting function, as shown in FIG. 1D.

On the other hand, if the remote control is set so that an action is made when the touch screen is pressed, in consideration of the above problem, another problem would occur, that is, the remote control would not be able to realize a flicking function or a dragging function which are basic operations of a touch screen.

SUMMARY

One or more exemplary embodiments provide an electronic device adopting a touch screen, the electronic device capable of realizing functions of a touch screen and functions of a remote control at the same time, and an operation control method thereof.

One or more exemplary embodiments also provide an electronic device adopting a touch screen, the electronic device capable of a continuous inputting operation and an operation control method thereof.

One or more exemplary embodiments also provide an electronic device adopting a touch screen, the electronic device capable of a flicking or dragging of the touch screen, and an operation control method thereof.

According to an aspect of an exemplary embodiment, there is provided an operation control method which may include: determining whether a second manipulation is made on a screen displayed on the touch screen during a predetermined time period after a first manipulation is made on the screen; and controlling to perform an operation corresponding to the second manipulation instead of an operation corresponding to the first manipulation, if the second manipulation is made during the predetermined time period after the first manipulation is made.

The controlling may include controlling to perform the operation corresponding to the first manipulation if the second manipulation is not made during the predetermined time period after the first manipulation is made.

The controlling may include controlling to repeatedly perform the operation corresponding to the first manipulation at a regular interval until a third manipulation is made on the screen if the second manipulation is not made during the predetermined time period after the first manipulation is made.

The third manipulation may be releasing an operation area of the screen.

The first manipulation may be pressing an operation area of the screen.

The second manipulation may be flicking or dragging an operation area of the screen.

The operation control method may further include determining whether the second manipulation is a manipulation to perform a first operation or to perform a second operation with reference to a given time after the predetermined time period, wherein the controlling may include controlling to perform the first operation if a third manipulation is made on the screen before the given time, and controlling to perform the second operation if the third manipulation is made on the screen on or after the given time.

Here, the first operation may be a flicking operation converting or moving the screen. The second operation may be a dragging operation dragging an icon on the screen. The third manipulation may be releasing an operation area of the screen.

The operation corresponding to the first manipulation may be generating a signal to control an external device, the signal being an IR signal, radio frequency (RF) signal, or a WiFi™ signal.

The electronic device may be a remote control.

According to an aspect of another exemplary embodiment, there is provided an electronic device which may include: a touch screen which receives a plurality of manipulations; and a controller which determines whether a second manipulation is made on a screen displayed on the touch screen during a predetermined time period after a first manipulation is made on the screen, and controls to perform an operation corresponding to the second manipulation instead of an operation corresponding to the first manipulation, if the second manipulation is made during the predetermined time period after the first manipulation is made.

The controller may control to perform the operation corresponding to the first manipulation if the second manipulation is not made during the predetermined time period after the first manipulation is made.

The controller may control to repeatedly perform the operation corresponding to the first manipulation at a regular interval until a third manipulation is made on the screen if the second manipulation is not made during the predetermined time period after the first manipulation is made, the third manipulation being releasing an operation area of the screen.

The first manipulation may be pressing an operation area of the screen and the second manipulation may be flicking or dragging an operation area of the screen.

The controller may further determine whether the second manipulation is a manipulation to perform a first operation or to perform a second operation with reference to a given time after the predetermined time period, and the controller may further control to perform the first operation if a third manipulation is made on the screen before the given time, and controls to perform the second operation if the third manipulation is made on the screen on or after the given time.

Here, the first operation may be a flicking operation converting or moving the screen. The second operation may be a dragging operation dragging an icon on the screen. The third manipulation may be releasing an operation area of the screen.

According to an aspect of another exemplary embodiment, there is provided a controller which may include an input unit which receives a plurality of manipulations of a user; and a control unit which recognizes the plurality of manipulations, determines a time period between a first manipulation and a second manipulation, which is an immediate next manipulation, among the plurality of manipulations, and determines an operation to be performed based on the time period.

Here, if the second manipulation is not recognized by the control unit during the time, the control unit may control a device connected to the controller to perform an operation corresponding to the first manipulation, and if the second manipulation is recognized by the control unit during the time, the control unit controls an operation with respect to the input unit to be performed at the input unit.

BRIEF DESCRIPTION OF THE DRAWINGS

FIGS. 4A to 4B are views illustrating the operation control method according to an exemplary embodiment;

FIGS. 5A and 5B are views illustrating an operation control method according to an exemplary embodiment.

DETAILED DESCRIPTION OF EXEMPLARY EMBODIMENTS

Figure 1A:
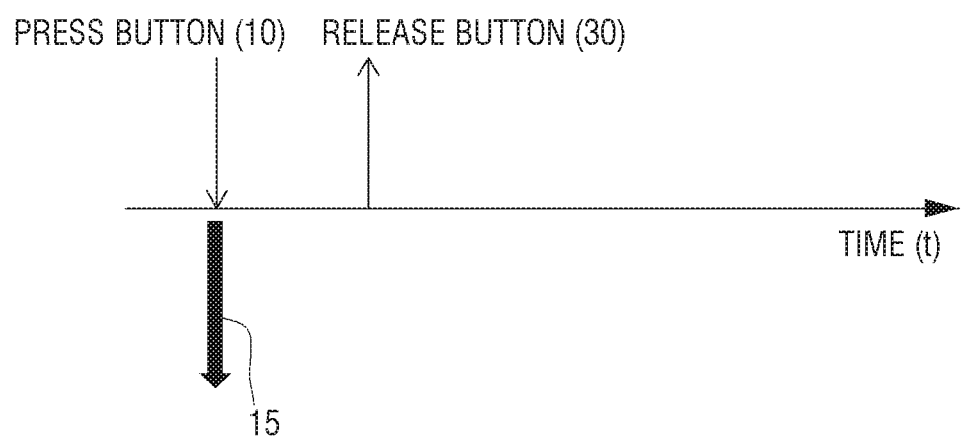
FIGS. 1A and 1B are views illustrating general operations of a remote control.
Figure 1B:
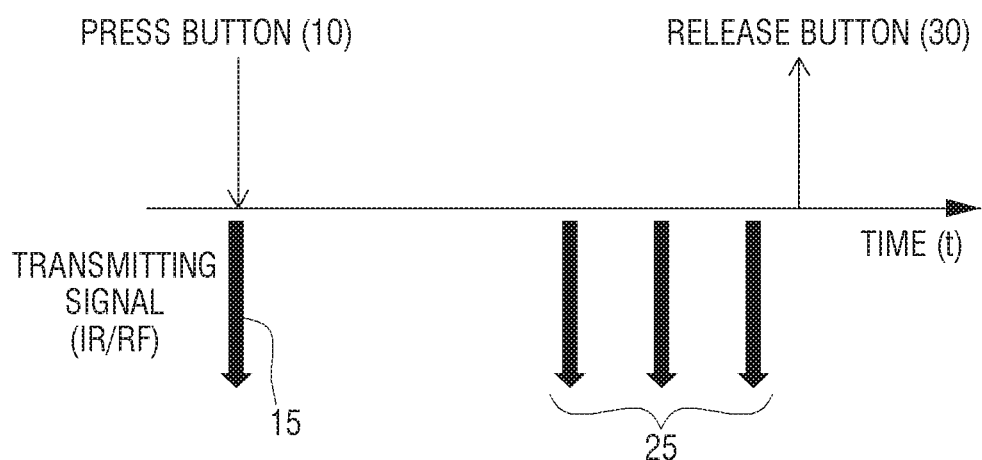
Figure 1C:
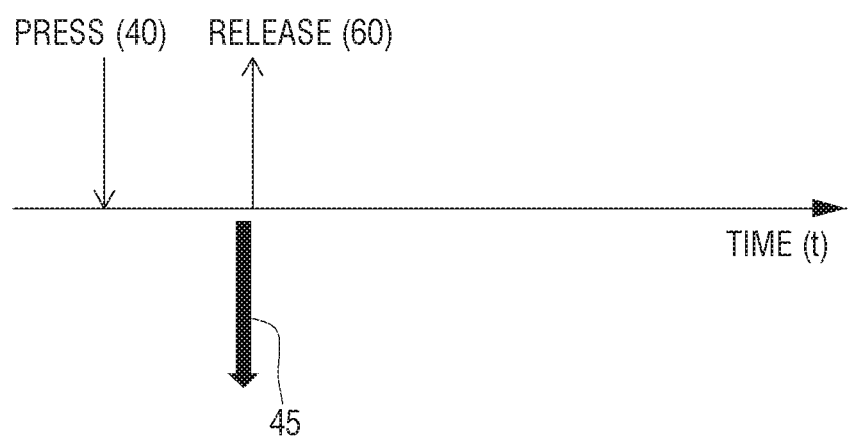
FIGS. 1C and 1D are views illustrating general operations of a touch screen.
Figure 1D:
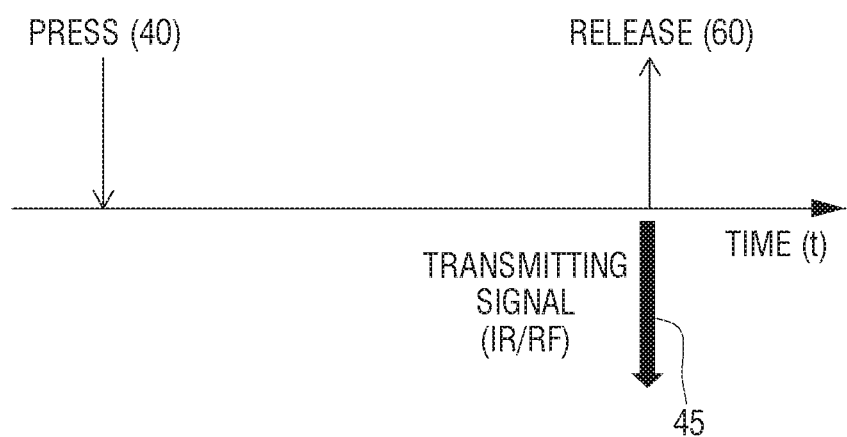

Certain exemplary embodiments are described in greater detail with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

Figure 2:
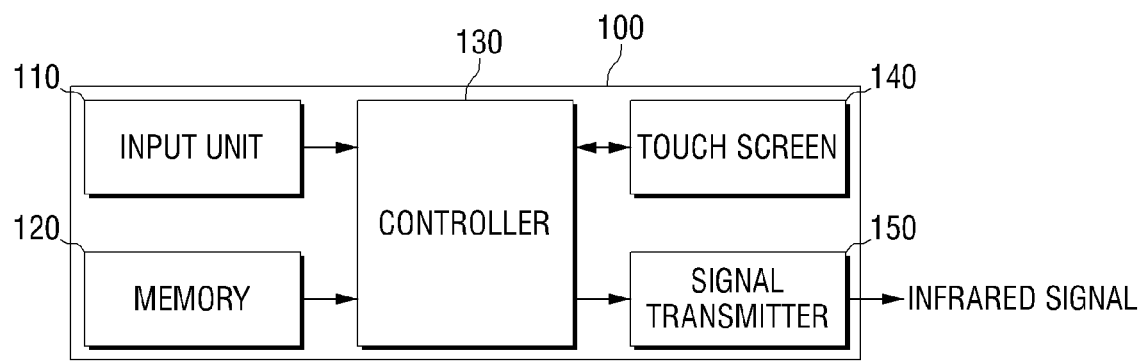
FIG. 2 is a block diagram illustrating a configuration of a remote control according to an exemplary embodiment.

FIG. 2 is a block diagram illustrating a configuration of a remote control according to an exemplary embodiment, the remote control 100 including an input unit 110, a memory 120, a controller 130, a touch screen 140 and a signal transmitter 150.

The input unit 110 receives a signal input through a button or key (not illustrated) provided in the remote control 100. The input unit 110 transmits the received signal to the controller 130, so that an operation of an external device or the remote control can be controlled according to a user's input.

The memory 120 has a function of storing data for controlling operations of the remote control 100. More specifically, in order to determine whether to perform a pressing operation, a flicking operation, or a dragging operation according to a press manipulation or a release manipulation, it should be determined whether a particular manipulation has been made within a reference time which is stored in the memory 120.

In addition, whether a manipulation is a flicking manipulation or a dragging manipulation is determined by an elapsed time from when a press manipulation is made until when a release manipulation is made, or by a moving speed from a point where a press manipulation is made to where a release manipulation is made. The memory 120 prestores the elapsed time or the moving speed which would distinguish the flicking manipulation from the dragging manipulation.

The reference time, the elapsed time or the moving speed stored in the memory 120 are used as references when determining a type of an operation to be made by the manipulation input by the input unit 110. Furthermore, the memory 120 may store various data necessary to control operations of the remote control 100.

The controller 130 controls the touch screen 140 and the signal transmitter 150, in order to control operations of the remote control 100 or the external device connected to the remote control wirelessly.

The touch screen 140 displays a button, etc. used for functioning as the remote control 100. Furthermore, the touch screen 140 transmits an event signal according to a user's manipulation. The event includes a pressing, a dragging, a flicking, and a scrolling.

In the case when the controller 140 controls the external device, the signal transmitter 150 generates a signal to control the external device and transmits the signal. In FIG. 2, an IR signal is generated and transmitted, but the external device may be controlled by an RF signal or a WiFi™ signal, not only by an IR signal.

Figure 3A:
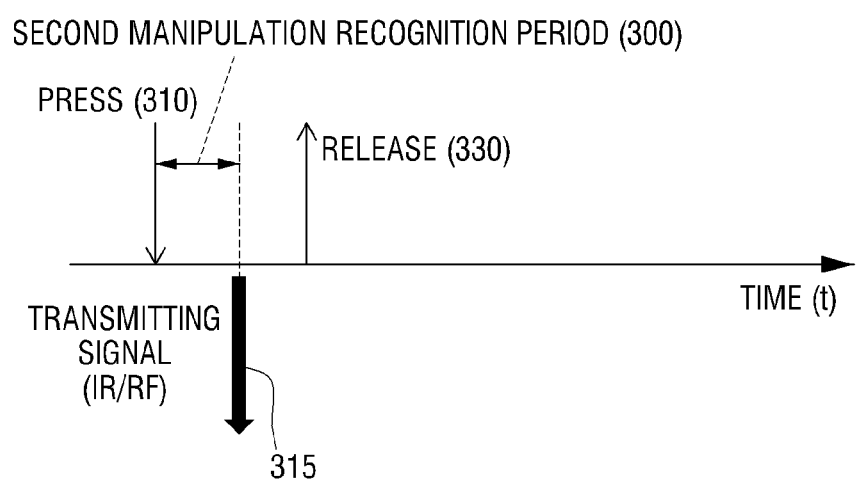
FIGS. 3A to 3D are views illustrating an operation control method according to an exemplary embodiment.
Figure 3B:
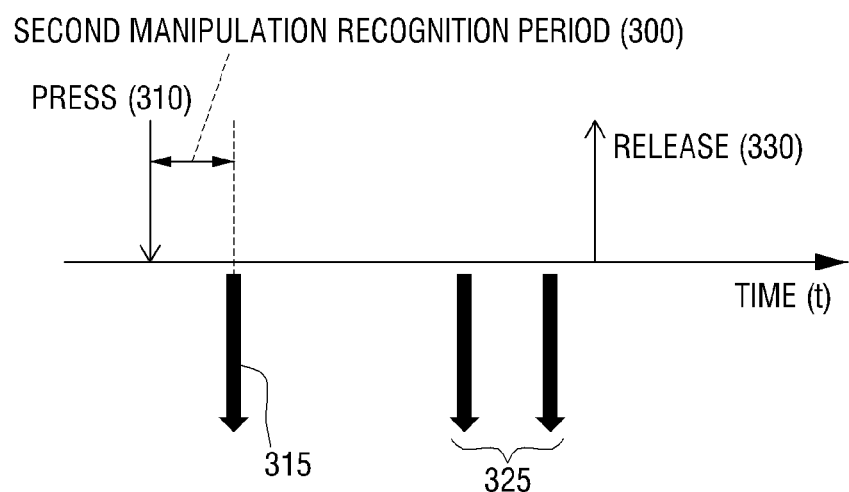
Figure 3C:
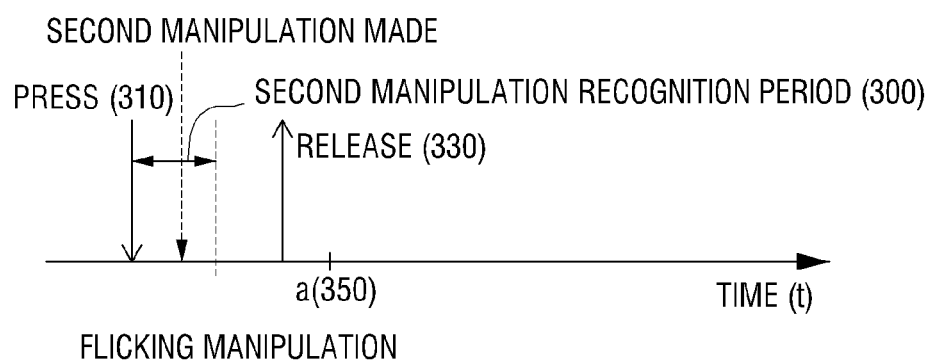
Figure 3D:
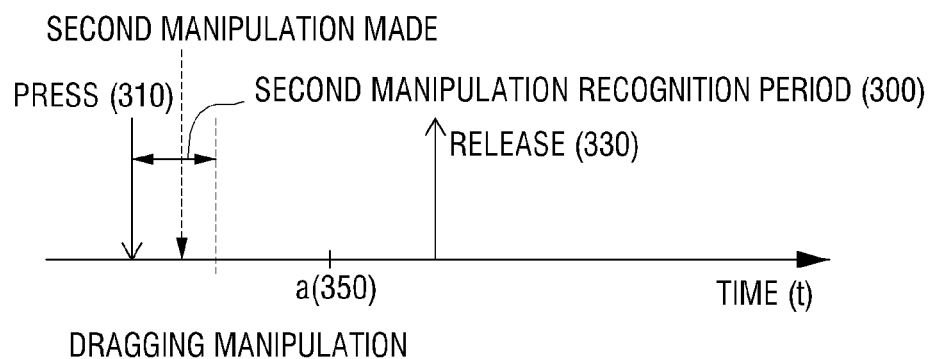

FIGS. 3A to 3D are views illustrating an operation control method according to an exemplary embodiment. More specifically, FIGS. 3A and 3B illustrate cases of performing a pressing operation, while FIGS. 3C and 3D illustrate cases of performing a flicking operation and a dragging operation.

As illustrated in FIG. 3A, when a press manipulation (310), which is regarded as a first manipulation, is made by a user, it is determined whether a second manipulation, is input during a second manipulation recognition period 300. If the second manipulation is not input during the second manipulation recognition period 300, a signal 315 such as an IR signal corresponding to the press manipulation is transmitted to the external device, to control the external device. Herein, the external device may be an image display device, a Personal Computer (PC), or an audio device.

FIG. 3B illustrates a case when a second manipulation is not input during a second manipulation recognition period 300 after a press manipulation is input, and thus, a signal 315 is generated, but a release manipulation 330 is made relatively belatedly. In this case, generating a signal in response to the press manipulation 310 is repeated a plurality of times at a regular interval. That is, a plurality of signals 325 are generated, and the external device 325 is controlled continuously.

FIG. 3C illustrates a case when a second manipulation is recognized during the second manipulation recognition period 300. In such a case when a second manipulation is input during the second manipulation recognition period 300 after a press manipulation 310, a signal is not generated in response to the press manipulation 310, but an operation is performed according to the second manipulation. However, since the second manipulation is made during the second manipulation recognition period 300, and since a time taken from when the press manipulation 310 is made until when the release manipulation 330 is made is shorter than a given time "a" (350), a flicking operation is performed.

FIG. 3D also illustrates a case when a second manipulation is recognized during the second manipulation recognition period 300. Likewise, in such a case when a second manipulation is made during the second manipulation recognition period 300 after a press manipulation 310 is made, no signal is generated in response to the press manipulation 310, but an operation is performed according to the second manipulation. However, since the second manipulation is made during the second manipulation recognition period 300, and since a time taken from when the press manipulation 310 is made until when a release manipulation 330 is made is longer than a given time "a" (350), a dragging operation is performed.

According to the above-mentioned exemplary embodiment, the remote control is capable of performing functions of a remote control and also functions of a touch screen. The operation control method illustrated in FIGS. 3A to 3C will be explained in more detail below with reference to FIGS. 4A to 5B.

Figure 4A:
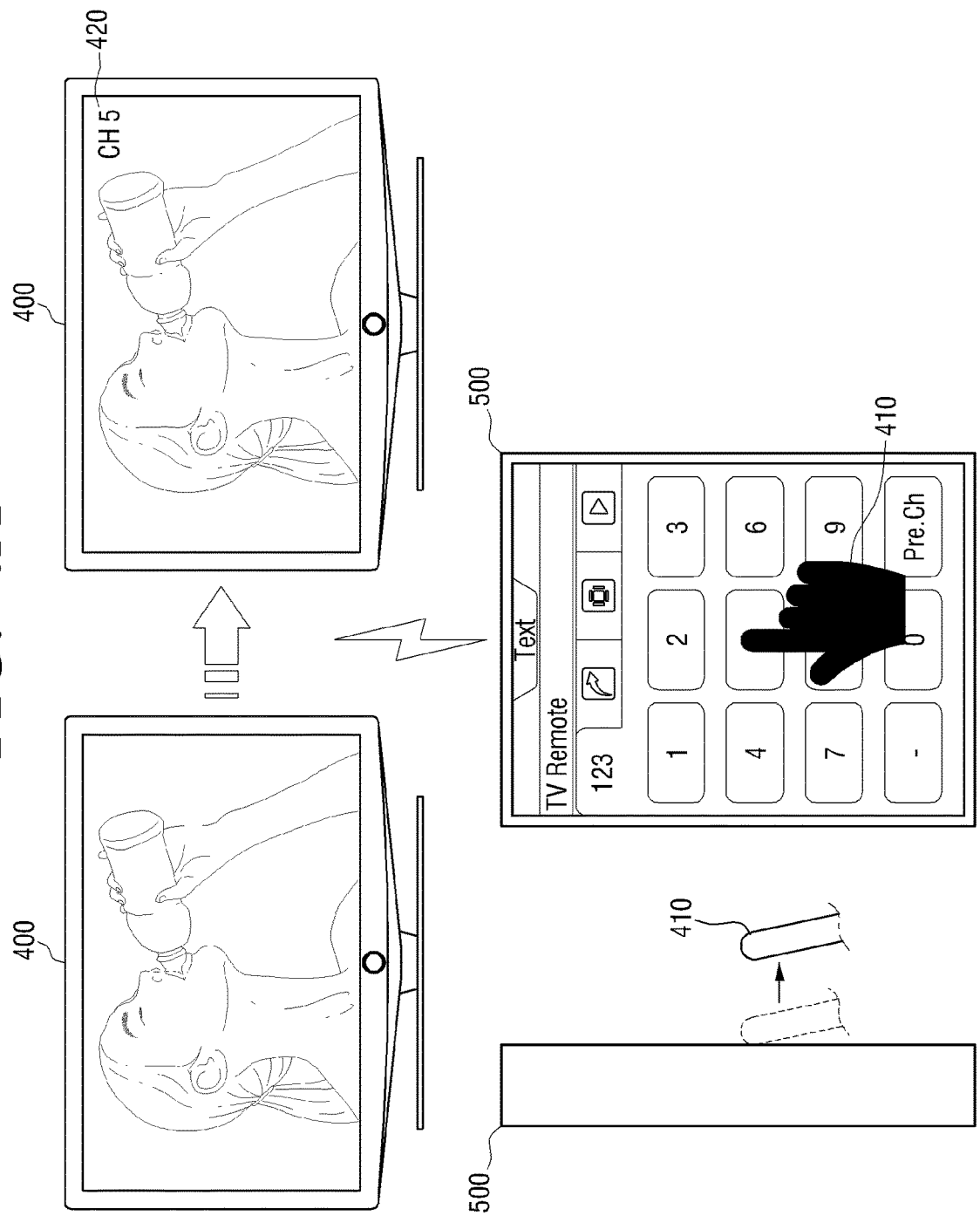

FIG. 4A is a view exemplifying the exemplary embodiment illustrated in FIG. 3A, and FIG. 4B is a view exemplifying the exemplary embodiment illustrated in FIG. 3B.

As illustrated in FIG. 4A, a remote control 500 controls an external device, a TV 400. The remote control 500 adopts a touch screen, and a user 410 may control the TV 400 by manipulating the touch screen 410. When the user 410 performs pressing on '5' of the touch screen, a channel 'CH5' (420) is displayed on a part of a screen of the TV 400 so that a channel of the TV 400 can be changed. Here, as illustrated in FIG. 3A, the pressing operation here corresponds to a case when a second manipulation is not input, that is, when there is not a flicking or dragging manipulation during the second manipulation recognition period 300, thereby generating a signal in response to the press manipulation 310. In FIG. 4A, a signal is generated only once since the release manipulation 330 is made relatively quickly, as in FIG. 3A.

In FIG. 4B, a second manipulation is not input during the second manipulation recognition period 300 just as in FIG. 3B. Since the release manipulation 330 is made relatively belatedly, a signal is generated for a plurality of times at a regular interval. When the user 410 presses button '5' for a long time and releases the button, a signal is generated after the second manipulation recognition period 300, and a signal is generated for a plurality of times continuously until a release manipulation is made. The TV 400 continuously receives the generated signal from the remote control 500, and 'CH555' (430) is displayed on a part of the TV screen so that a channel can be changed.

Figure 5B:
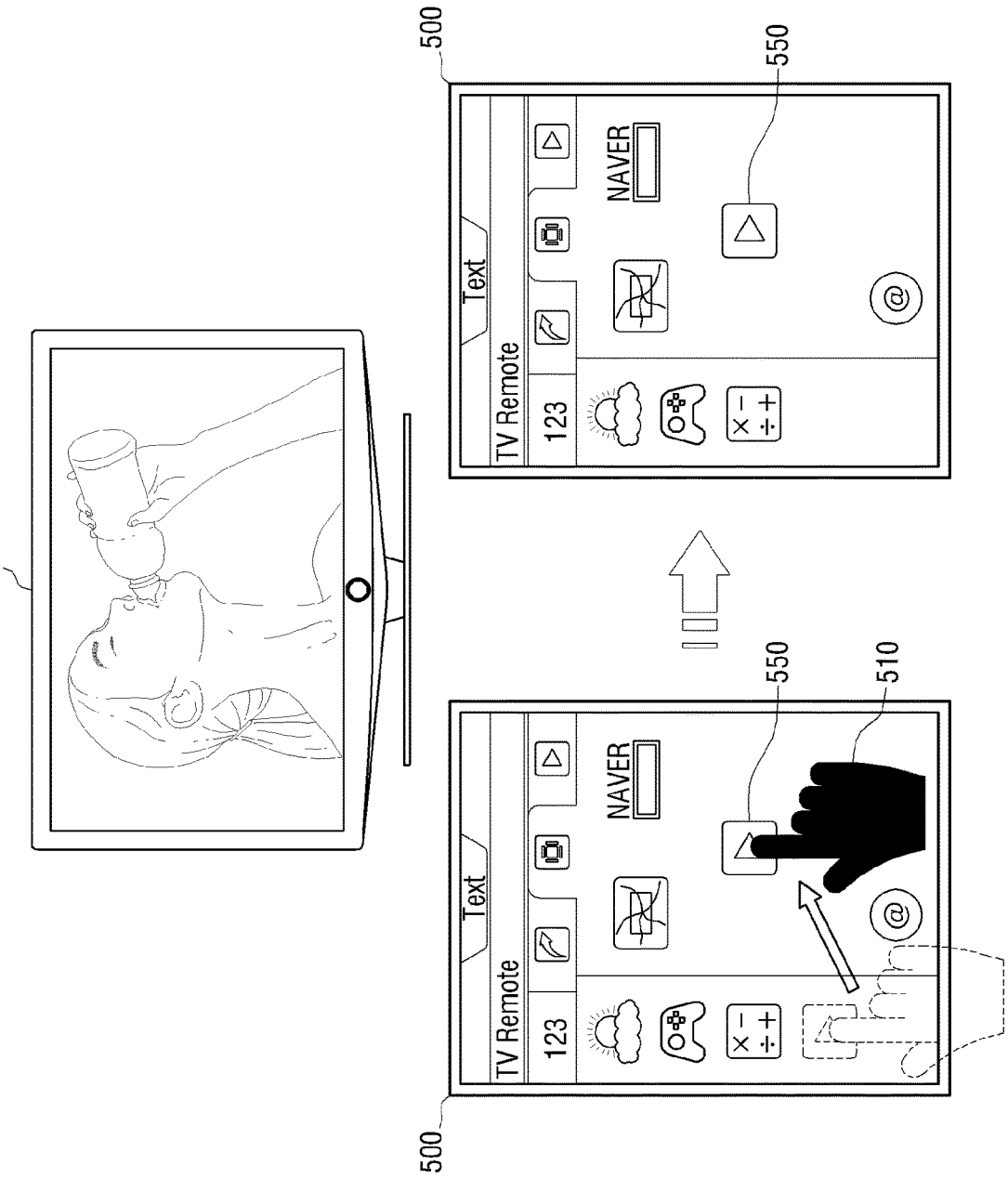

FIGS. 5A and 5B exemplify cases when a second manipulation is input during the second manipulation recognition period 300, as in the exemplary embodiment of FIGS. 3C and 3D.

As in FIG. 3C, when the second manipulation is made by the user 510 during the second manipulation recognition period 300, and when the time period from when the press manipulation 310 is made until when the release manipulation 330 is made is shorter than the given time "a" (350), a flicking manipulation is recognized. A flicking manipulation refers to a manipulation of pressing the touch screen and making a release while sliding towards a top, bottom, left, or right side.

That is, although in FIG. 5A, a button input screen 520 is displayed on the remote control 500, when a flicking manipulation is made during the second manipulation recognition period 300, a flicking operation is performed according to the flicking manipulation without generating a signal to control the TV 400, thereby converting or moving the current button input screen 520 to anther screen 530.

When a second manipulation is made by the user 510 during the second manipulation recognition period 300 and a time period from when the press manipulation 310 is made until when the release manipulation 330 is made is longer than the given time "a" (350) as in the exemplary embodiment of FIG. 3D, a dragging manipulation is recognized.

Here, the dragging manipulation refers to a manipulation of pressing the touch screen, moving to another position while still pressing the touch screen, and then releasing the touch screen. Such a dragging manipulation is mainly used to move an icon, etc. displayed on the touch screen to another position on the touch screen.

On a screen displayed on the current remote control 500 in FIG. 5B, there are icons included in a widget. Herein, when a manipulation of dragging a video on demand (VOD) icon 550 is input by the user 510 during the second manipulation recognition period 300 as in the exemplary embodiment of FIG. 3D, a dragging operation is made without generating a signal to control the TV 500. That is, the VOD icon 550 is moved from the original position to the position where the release manipulation is made.

As aforementioned, the controller 130 is an element of the remote control 500, which determines whether a user's manipulation is a flicking manipulation or a dragging manipulation based on a timing of a manipulation input by the user in the input unit 110 with reference to an elapsed time or moving speed prestored in the memory 120 which distinguishes a flicking manipulation from a dragging manipulation. Thereafter, the controller 130 performs the flicking operation or the dragging operation on the touch screen 140. Here, the prestored elapsed time and the movement speed may be changed by the user.

Figure 6:
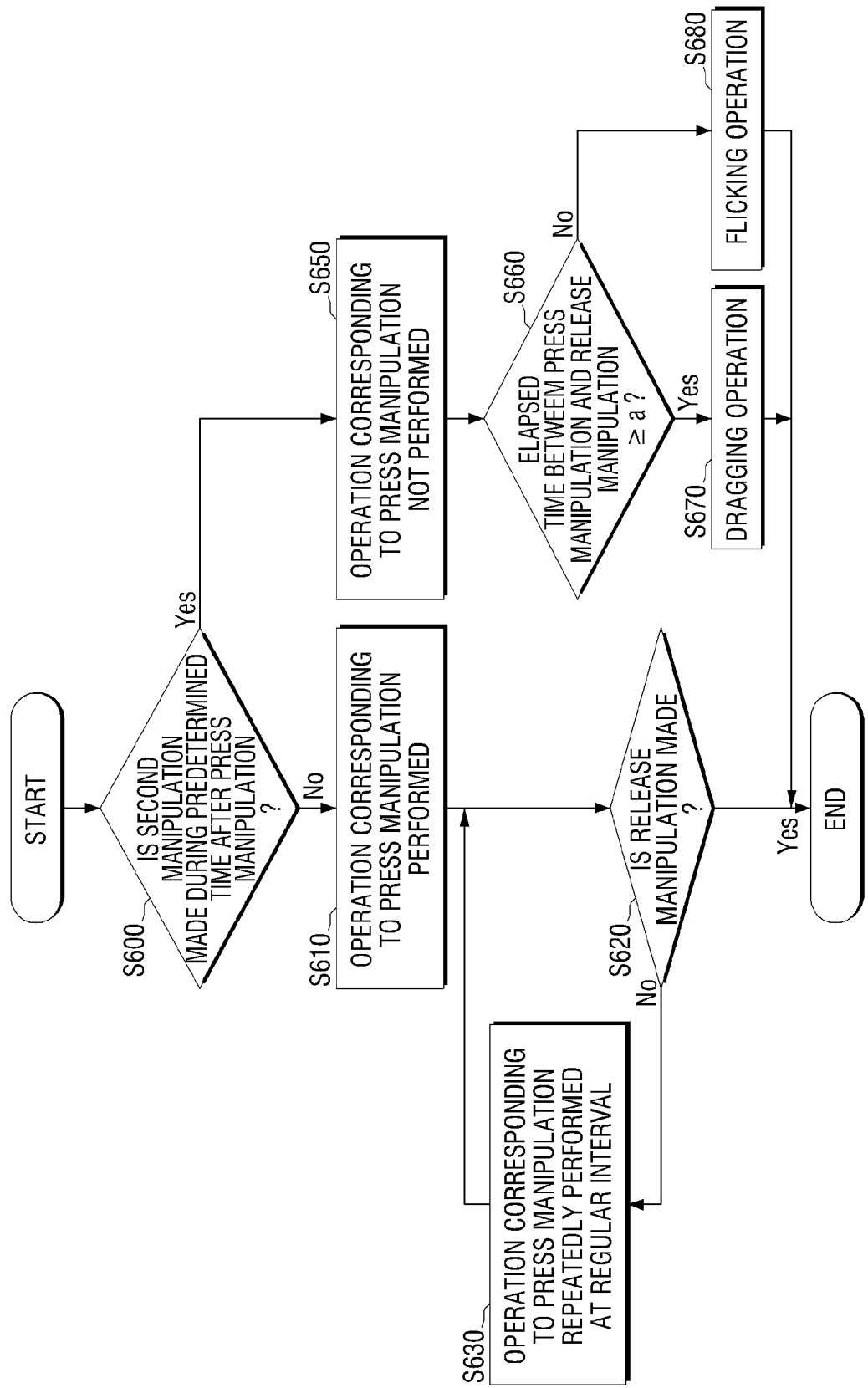
FIG. 6 is a flowchart illustrating the operation control method according to an exemplary embodiment.

FIG. 6 is a flowchart explaining the operation control method according to an exemplary embodiment. According to the flowchart, after a pressing manipulation, which is regarded as a first manipulation, is made, it is determined whether a second manipulation is input during a predetermined time, that is, during a second manipulation recognition period (S600). If the second manipulation is not input during the predetermined time after the press manipulation (S600—NO), an operation corresponding to the press manipulation, that is, generating a signal to control the external device, is performed (S610).

If a release manipulation is input after the operation corresponding to the press manipulation is performed (S620—YES), the process ends. However, if a release manipulation is not input even after the operation corresponding to the press manipulation is performed (S620—NO), the operation corresponding to the press manipulation is performed repeatedly at a regular interval (S630). That is, generating a signal, which is the same as the signal generated at operation S610, is performed repeatedly at a regular interval, and the external device is controlled by the generated signals. The external device may be any one of a television (TV), a personal computer (PC), or an audio device, that can be controlled by a remote control, while the signal may be an IR signal, a radio frequency (RF) signal, or a WiFi™ signal. That is, the remote control may change a channel or volume of the external device by generating the IR signal, RF signal, or WiFi™ signal.

However, repeatedly performing the operation corresponding to the press manipulation is continued only until a release manipulation is input, that is, if a release manipulation is input (S620—YES), the operation stops.

In the case when a second manipulation is input during the predetermined time after the press manipulation (S600—YES), an operation corresponding to the press manipulation is not performed (S650). That is, the remote control does not generate a signal to control the external device in response to the press manipulation.

Herein, if an elapsed time from when the first manipulation is made until when a third manipulation is made is the same or longer than a given time a (S660—YES), a dragging operation is performed. That is, an operation of dragging an icon etc. of the screen of the remote control is performed.

However, if the elapsed time from when the first manipulation is made until when the third manipulation is made is shorter than the given time a (S660—NO), a flicking operation is performed. That is, an operation of converting or moving the screen of the remote control is performed.

Electronic devices adopting a touch screen and the operation control method thereof according to the aforementioned exemplary embodiment are capable of realizing basic operations of a remote control and basic operations of a touch screen at the same time.

In addition, electronic device adopting a touch screen and the operation control method thereof according to the aforementioned another exemplary embodiment are capable of not only performing a continuous inputting operation of a remote control, but also realizing a flicking operation and a dragging operation of a touch screen.

Although a few exemplary embodiments have been shown and described, it would be appreciated by those skilled in the art that changes may be made in these embodiments without departing from the principles and spirit of the inventive concept, the scope of which is defined in the claims and their equivalents.

What is claimed is:

1. An operation control method of an electronic device having a touch screen, the electronic device remotely controlling an external device, the operation control method comprising:
    executing an application program for controlling the external device;
    controlling the touch screen of the electronic device to display a first menu screen of the application program, the first menu screen including at least one menu item of a first type for controlling the external device;
    in response to a touch on a first menu item among the at least one menu item, determining whether there is a touch move after the touch on the first menu item before a predetermined time is elapsed;
    in response to determining that the predetermined time is elapsed without a touch move, controlling a communicator of the electronic device to transmit a first command signal to control the external device to perform an operation corresponding to the first menu item; and
    in response to determining that there is a touch move before the predetermined time is elapsed, controlling the touch screen of the electronic device to display a second menu screen of the application program, the second menu screen including at least one menu item of a second type for controlling the external device;
    wherein the controlling the communicator of the electronic device to transmit the first command signal comprises before a release manipulation is made after transmitting the first command signal, controlling the communicator of the electronic device to repeatedly transmit the first command signal a plurality of times at an interval until the release manipulation is input, and
    wherein the touch move corresponds to a flicking operation or a dragging operation.

2. The operation control method as claimed in claim 1, further comprising, in response to determining that the predetermined time is elapsed without a touch move, and the touch on the first menu item being continuously maintained, controlling the communicator of the electronic device to transmit the first command signal repeatedly until there is a touch move or the touch on the first menu item is released.

3. The operation control method as claimed in claim 1, wherein the touch is pressing an operation area of the first menu screen, and
    wherein the touch move is flicking or dragging the operation area of the first menu screen.

4. The operation control method as claimed in claim 1, further comprising determining whether the touch move is a manipulation to perform a first operation or to perform a second operation with reference to a given time after a predetermined time period,
    wherein the controlling the electronic device to execute the operation comprises:

controlling to perform the first operation if a release on the first menu screen is made on the touch screen before the given time; and controlling to perform the second operation if the release on the first menu screen is made on the touch screen on or after the given time.

5. The operation control method as claimed in claim 1, wherein the operation corresponding to the touch is generating a signal to control an external device, the signal being an infrared (IR) signal, a radio frequency (RF) signal, or a wireless local area network signal.

6. The operation control method as claimed in claim 1, wherein the electronic device is a remote control.

7. The operation control method as claimed in claim 1, wherein the at least one menu item of the first type is any one of a number button, a channel button, the at least one menu item of the second type is any one of source change button, mute button, internet execute button, multimedia execute button.

8. An electronic device remotely controlling an external device, the electronic device comprising:
a communicator;
a touch display; and
a controller configured to:
execute an application program for controlling the external device,
control the touch display to display a first menu screen of the application program, the first menu screen including at least one menu item of a first type for controlling the external device,
in response to a touch on a first menu item among the at least one menu item, determine whether there is a touch move after the touch on the first menu item before a predetermined time is elapsed,
in response to determining that the predetermined time is elapsed without a touch move, control the communicator to transmit a first command signal to control the external device to perform an operation corresponding to the first menu item, and
in response to determining that there is a touch move before the predetermined time is elapsed, control the touch display to display a second menu screen of the application program, the second menu screen including at least one menu item of a second type for controlling the external device,
wherein the controller is configured to, before a release manipulation is made after the communicator transmitting the first command signal, control the communicator to repeatedly transmit the first command signal a plurality of times at an interval until the release manipulation is input, and
wherein the touch move corresponds to a flicking operation or a dragging operation.

9. The electronic device as claimed in claim 8, wherein the controller, in response to determining that the predetermined time is elapsed without a touch move, and the touch on the first menu item being continuously maintained, is configured to transmit the first command signal repeatedly until there is a touch move or the touch is released.

10. The electronic device as claimed in claim 8, wherein the touch comprises pressing an operation area of the touch display.

11. The electronic device as claimed in claim 10, wherein the touch move comprises flicking or dragging the operation area of the touch display.

12. The electronic device as claimed in claim 8, wherein the operation corresponding to the touch is generating a signal to control an external device, the signal being an infrared (IR) signal, a radio frequency (RF) signal, or a wireless local area network signal.

13. The electronic device as claimed in claim 8, wherein the controller is configured to control the electronic device to execute the operation corresponding to the first menu item to control the external device in response to the touch being released.

14. The electronic device as claimed in claim 8, the controller is configured to control the electronic device to execute the operation corresponding to the first menu item to control the external device in response to the touch being released without the touch move.

15. The electronic device as claimed in claim 14, the controller is configured to control the touch display to display the second menu screen in response to a touch release of the touch move within a predetermined time period after the touch without the touch being released until the touch release of the touch move is made.

16. The electronic device as claimed in claim 8, wherein the at least one menu item of the first type is any one of a number button, a channel button, the at least one menu item of the second type is any one of source change button, mute button, internet execute button, multimedia execute button.

17. A non-transitory computer-readable medium storing an application program executable by at least one processor of an electronic device to execute a method of remotely controlling an external device, the method comprising:
controlling a touch display of the electronic device to display a first menu screen of the application program, the first menu screen including at least one menu item of a first type for controlling the external device;
in response to a touch on a first menu item among the at least one menu item, determining whether there is a touch move after the touch on the first menu item before a predetermined time is elapsed;
in response to determining that the predetermined time is elapsed without a touch move, controlling a communicator of the electronic device to transmit a first command signal to control the external device to perform an operation corresponding to the first menu item; and
in response to determining that there is a touch move before the predetermined time is elapsed, controlling the touch display of the electronic device to display a second menu screen of the application program, the second menu screen including at least one menu item of a second type for controlling the external device;
wherein the controlling the communicator of the electronic device to transmit the first command signal comprises, before a release manipulation is made after transmitting the first command signal, controlling the communicator of the electronic device to repeatedly transmit the first command signal a plurality of times at an interval until the release manipulation is input, and
wherein the touch move corresponds to a flicking operation or a dragging operation.

18. The method as claimed in claim 17, wherein the method further comprises, in response to determining that the predetermined time is elapsed without a touch move, and the touch on the first menu item being continuously maintained, controlling the communicator of the electronic device to transmit the first command signal repeatedly until there is a touch move or the touch at the first menu item is released.

* * * * *